(12) United States Patent
Miyamoto et al.

(10) Patent No.: US 11,712,981 B2
(45) Date of Patent: Aug. 1, 2023

(54) VEHICLE

(71) Applicant: HONDA MOTOR CO., LTD., Tokyo (JP)

(72) Inventors: Tetsu Miyamoto, Saitama (JP); Toshikatsu Katagiri, Saitama (JP); Kengo Aoki, Saitama (JP); Naoki Fujihara, Saitama (JP); Ayumu Uno, Tokyo (JP); Takeshi Otani, Saitama (JP); Naoyuki Nakamura, Saitama (JP); Kenta Sugitate, Saitama (JP); Hiroto Kobayashi, Saitama (JP); Satoko Ito, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 220 days.

(21) Appl. No.: 17/416,815

(22) PCT Filed: Dec. 21, 2018

(86) PCT No.: PCT/JP2018/047374
§ 371 (c)(1),
(2) Date: Jun. 21, 2021

(87) PCT Pub. No.: WO2020/129258
PCT Pub. Date: Jun. 25, 2020

(65) Prior Publication Data
US 2022/0111760 A1    Apr. 14, 2022

(51) Int. Cl.
*F25D 23/12* (2006.01)
*B60L 58/26* (2019.01)
(Continued)

(52) U.S. Cl.
CPC .......... *B60L 58/26* (2019.02); *B60H 1/00278* (2013.01); *B60L 53/62* (2019.02);
(Continued)

(58) Field of Classification Search
CPC .... B60L 58/26; B60L 53/62; B60L 2240/545; B60H 1/00278; B60H 2001/00307
(Continued)

(56) References Cited

U.S. PATENT DOCUMENTS

2010/0293966 A1    11/2010    Yokomachi et al.
2016/0153343 A1    6/2016    Kakehashi et al.
(Continued)

FOREIGN PATENT DOCUMENTS

CN    109774409 B    *    1/2021
JP    2011-001048 A    1/2011
(Continued)

OTHER PUBLICATIONS

Apr. 2, 2019, International Search Report issued for related PCT application No. PCT/JP2018/047374.
(Continued)

*Primary Examiner* — Davis D Hwu
(74) *Attorney, Agent, or Firm* — Paratus Law Group, PLLC

(57) ABSTRACT

A vehicle includes a battery, an air conditioner, a first temperature adjustment circuit including a first pump and a chiller, a second temperature adjustment circuit including a second pump and a radiator, a coupling passage configured to connect the first temperature adjustment circuit and the second temperature adjustment circuit to form a coupling circuit, an electromagnetic switching valve configured to switch between a circulation state in which the heat medium can circulate through the coupling circuit and a non-circulation state in which the heat medium cannot circulate through the coupling circuit, a first temperature sensor configured to acquire a first temperature which is a tem-
(Continued)

perature of the battery, and a control device configured to select any one mode of a plurality of modes in accordance with the first temperature.

17 Claims, 10 Drawing Sheets

(51) Int. Cl.
    *B60L 53/62*     (2019.01)
    *B60H 1/00*     (2006.01)

(52) U.S. Cl.
    CPC ............... *B60H 2001/00307* (2013.01); *B60L 2240/545* (2013.01)

(58) Field of Classification Search
    USPC ........................................................ 62/259.2
    See application file for complete search history.

(56) References Cited

U.S. PATENT DOCUMENTS

| | | |
|---|---|---|
| 2017/0021698 A1 | 1/2017 | Hatakeyama et al. |
| 2018/0072130 A1 | 3/2018 | Kim |

FOREIGN PATENT DOCUMENTS

| | | |
|---|---|---|
| JP | 2013-119259 A | 6/2013 |
| JP | 2013-188098 A | 9/2013 |
| JP | 2014-181594 A | 9/2014 |
| JP | 2015-186989 A | 10/2015 |
| JP | 2018-043741 A | 3/2018 |

OTHER PUBLICATIONS

Apr. 2, 2019, International Search Opinion issued for related PCT application No. PCT/JP2018/047374.

\* cited by examiner

*FIG. 7*

| BATTERY TEMPERATURE (Tbat) | | | |
|---|---|---|---|
| LOW ◄——— T1 ——————— T2 ——————— T3 ———► HIGH | | | |
| HEATING REQUEST | HEAT INSULATING REQUEST | COOLING REQUEST | STRONG COOLING REQUEST |
| SEPARATE | SEPARATE | PARALLEL | PARALLEL |

VEHICLE

CROSS REFERENCE TO PRIOR APPLICATION

This application is a National Stage Patent Application of PCT International Patent Application No. PCT/JP2018/047374 (filed on Dec. 21, 2018) under 35 U.S.C. § 371, which is hereby incorporated by reference in its entirety.

TECHNICAL FIELD

The present invention relates to a vehicle which performs temperature adjustment of a battery and a power conversion device.

BACKGROUND ART

There has been known an electric vehicle which includes a first temperature adjustment circuit, a second temperature adjustment circuit, a pump which circulates a heat medium in at least one of the first temperature adjustment circuit and the second temperature adjustment circuit, a coupling passage which connects the first temperature adjustment circuit and the second temperature adjustment circuit to form a coupling circuit, and a switching unit which can switch between a circulation state in which the heat medium circulates through the coupling circuit and a non-circulation state in which the heat medium does not circulate through the coupling circuit.

For example, Patent Literature 1 discloses that in an electric vehicle including a cooling circuit for cooling a battery, a cooling circuit for cooling an inverter, a first refrigerant pump provided in the cooling circuit for cooling the battery, a second refrigerant pump provided in the cooling circuit for cooling the inverter, and a switching valve which switches between a state in which temperatures of the battery and the inverter are adjusted in the same circuit (hereinafter also referred to as a "circulation state") and a state in which the temperatures of the battery and the inverter are adjusted by separate circuits (hereinafter also referred to as a "non-circulation state"), when an outside air temperature is lower than a predetermined temperature, the circulation state is set, and when the outside air temperature is equal to or higher than the predetermined temperature, the non-circulation state is set, so that accuracy of the temperature adjustment is increased.

CITATION LIST

Patent Literature

Patent Literature 1: JP-A-2013-188098

SUMMARY OF INVENTION

Technical Problem

However, in the electric vehicle disclosed in Patent Literature 1, since the circulation state and the non-circulation state are switched in accordance with the outside air temperature, there is a concern that the circulation state and the non-circulation state are switched regardless of a temperature of the battery, and the battery may be not appropriately cooled.

The present invention provides a vehicle capable of appropriately cooling a battery.

Solution to Problem

According to the present invention, there is provided a vehicle including:

a battery;

an air conditioner;

a first temperature adjustment circuit including a first pump configured to supply a heat medium to the battery, and a first heat exchange unit configured to exchange heat between the heat medium and a heat medium for air conditioning;

a second temperature adjustment circuit including a second pump configured to supply the heat medium to a power conversion device and a second heat exchange unit configured to exchange heat between the heat medium and an outside air;

a coupling passage configured to connect the first temperature adjustment circuit and the second temperature adjustment circuit to form a coupling circuit;

a switching unit configured to switch between a circulation state in which the heat medium is capable of circulating through the coupling circuit and a non-circulation state in which the heat medium is not capable of circulating through the coupling circuit;

a first temperature acquisition unit configured to acquire a first temperature which is a temperature of the battery; and a control device configured to select any one mode of a plurality of modes, wherein the plurality of modes include:

a series mode in which, in the circulation state, the heat medium is circulated in the coupling circuit in a state in which the first heat exchange unit is not capable of exchanging heat between the heat medium and the heat medium for air conditioning;

a separate mode in which the heat medium is circulated in the second temperature adjustment circuit in the non-circulation state; and a parallel cooling mode in which, in the non-circulation state, the heat medium is circulated in the second temperature adjustment circuit, and the heat medium is circulated in the first temperature adjustment circuit in a state in which the first heat exchange unit is capable of exchanging heat between the heat medium and the heat medium for air conditioning, and in which the control device selects the any one mode of the plurality of modes in accordance with the first temperature.

Advantageous Effects of Invention

According to the present invention, by selecting the mode in accordance with the first temperature which is the temperature of the battery, the battery can be appropriately cooled as compared with a case where the switching is controlled in accordance with an outside air temperature.

BRIEF DESCRIPTION OF DRAWINGS

FIG. 7 is an explanatory diagram illustrating a mode selected by the mode selection process of FIG. 5 (in a case where the inlet temperature of the power conversion device is out of the predetermined temperature range).

DESCRIPTION OF EMBODIMENTS

Hereinafter, an embodiment of the present invention will be described with reference to FIGS. 1 to 9.

[Temperature Adjustment Circuit]

Figure 1:
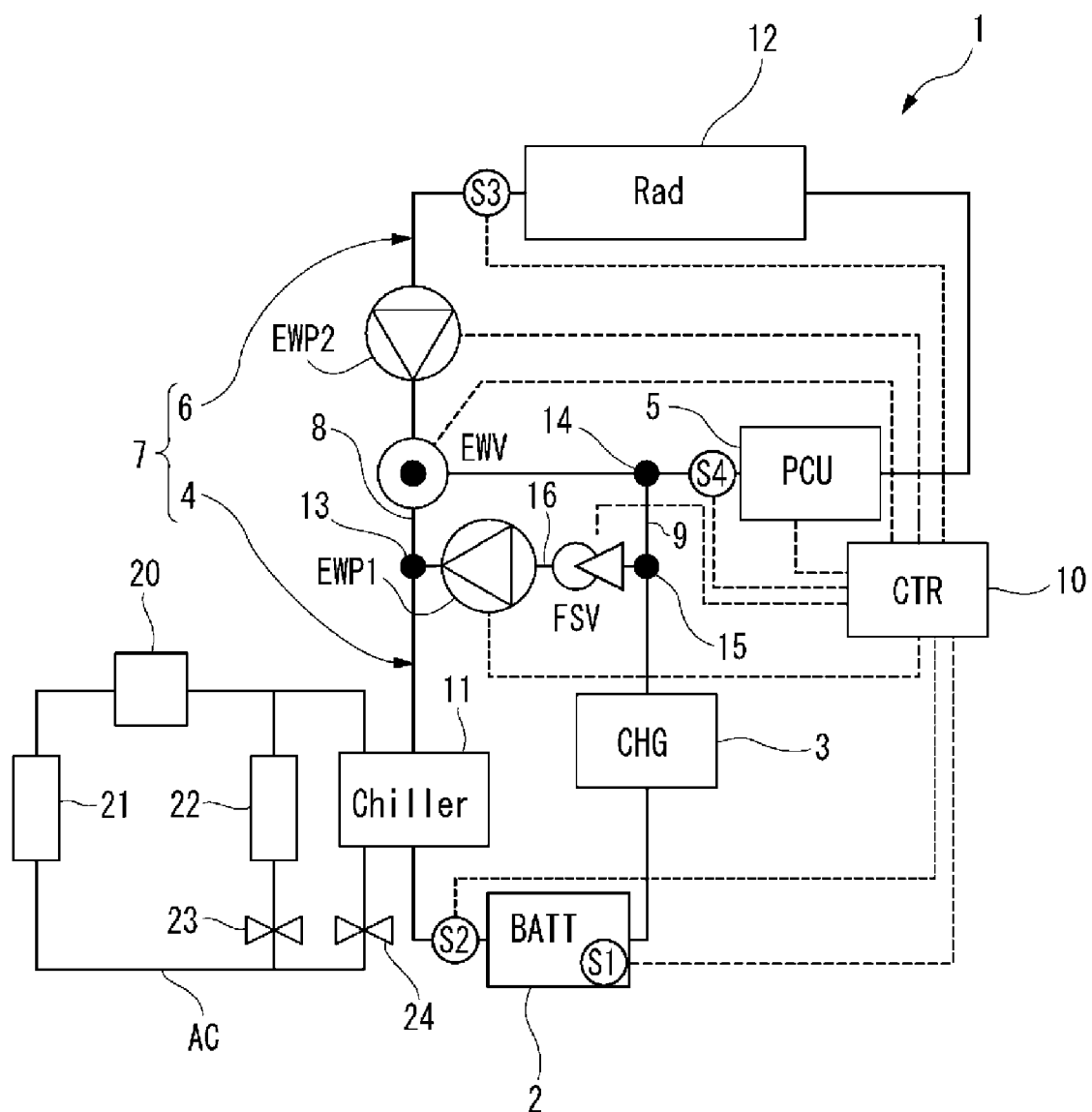
FIG. 1 is a circuit diagram illustrating a configuration of a temperature adjustment circuit included in a vehicle according to an embodiment of the present invention.

First, a temperature adjustment circuit 1 mounted on a vehicle according to an embodiment of the present invention will be described. As illustrated in FIG. 1, the temperature adjustment circuit 1 includes a first temperature adjustment circuit 4 including a first pump EWP1 which supplies a heat medium to a battery 2 and a charger 3, and a chiller 11 which can exchange heat between the heat medium and a heat medium for air conditioning, a second temperature adjustment circuit 6 including a second pump EWP2 which supplies a heat medium to a power conversion device 5, and a radiator 12 which performs heat exchange between the heat medium and an outside air, a first coupling passage 8 and a second coupling passage 9 which connect the first temperature adjustment circuit 4 and the second temperature adjustment circuit 6 to form a coupling circuit 7, an electromagnetic switching valve EWV which can switch between a circulation state in which the heat medium can circulate through the coupling circuit 7 and a non-circulation state in which the heat medium cannot circulate through the coupling circuit 7, and a control device 10 which selects any one mode of a plurality of modes. The heat medium is a liquid medium such as water, a radiator liquid, or a coolant liquid.

[Plurality of Modes]

The plurality of modes include a series mode in which the heat medium is circulated in the coupling circuit 7 in a state in which the chiller 11 is not able to exchange heat between the heat medium and the heat medium for air conditioning in the circulation state, a separate mode in which the heat medium is circulated in the second temperature adjustment circuit 6 in the non-circulation state, and a parallel cooling mode in which in the non-circulation state, the heat medium is circulated in the second temperature adjustment circuit 6 and the heat medium is circulated in the first temperature adjustment circuit 4 in a state in which the chiller 11 is able to exchange the heat between the heat medium and the heat medium for air conditioning.

The separate mode is not a mode in which the circulation of the heat medium in the first temperature adjustment circuit 4 is prohibited. For example, in the separate mode, deviation of the temperature of the heat medium may be eliminated by circulating the heat medium through the first temperature adjustment circuit 4 without operating the chiller 11. In addition, in a case where the first temperature adjustment circuit 4 includes a heating unit for heating the heat medium, in the separate mode, the heating unit is enabled to circulate the heat medium in the first temperature adjustment circuit 4, so that the battery 2 can be heated. Hereinafter, the first temperature adjustment circuit 4, the second temperature adjustment circuit 6, the coupling circuit 7, and the control device 10 will be described in detail.

[First Temperature Adjustment Circuit]

The first temperature adjustment circuit 4 includes the first pump EWP1 which circulates the heat medium in the circuit, the chiller 11 which is disposed downstream of the first pump EWP1 and can exchange heat between the heat medium and the heat medium for air conditioning, the battery 2 and the charger 3 which are disposed downstream of the chiller 11, and an electromagnetic on-off valve FSV which is disposed downstream of the charger 3 and upstream of the first pump EWP1.

Figure 3:
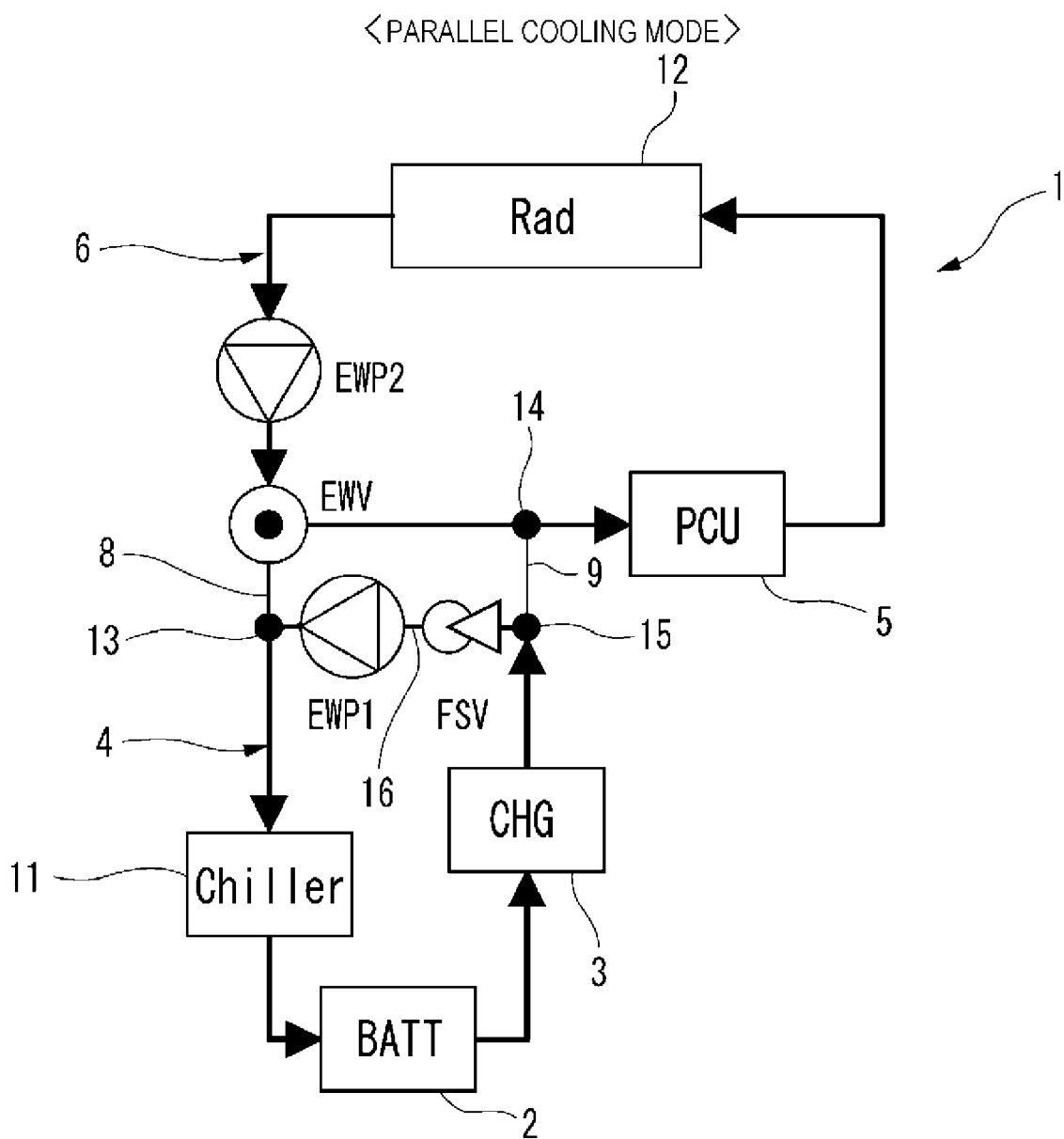
FIG. 3 is an explanatory diagram illustrating a flow of the heat medium in a parallel cooling mode in the temperature adjustment circuit of FIG. 1.

As illustrated in FIG. 3, in the parallel cooling mode, by driving the first pump EWP1 in an open state of the electromagnetic on-off valve FSV, the heat medium discharged by the first pump EWP1 can be circulated in an order of the chiller 11, the battery 2, and the charger 3. Accordingly, the heat medium cooled by the chiller 11 exchanges heat with the battery 2 and the charger 3, and the battery 2 and the charger 3 are cooled.

Returning to FIG. 1, an air conditioner AC through which the heat medium for air conditioning flows includes a compressor 20, a condenser 21, an evaporator 22, and shut-off valves 23, 24, and the compressor 20, the condenser 21, and the evaporator 22 are connected in series, and the evaporator 22 and the chiller 11 are connected in parallel. In the air conditioner AC, a flow path to the evaporator 22 and a flow path to the chiller 11 are switchable by the shut-off valves 23, 24.

[Second Temperature Adjustment Circuit]

The second temperature adjustment circuit 6 includes the second pump EWP2 which circulates the heat medium in the circuit, the electromagnetic switching valve EWV which is disposed downstream of the second pump EWP2 and switches the mode, the power conversion device 5 which is disposed downstream of the electromagnetic switching valve EWV, and the radiator 12 which is disposed downstream of the power conversion device 5 and performs heat exchange between the heat medium and the outside air. The power conversion device 5 includes at least one of an inverter which converts direct current electric power into alternating current electric power and also converts the alternating current electric power into the direct current electric power, and a DC-DC conversion device which boosts or steps down a direct current voltage.

Figure 2:
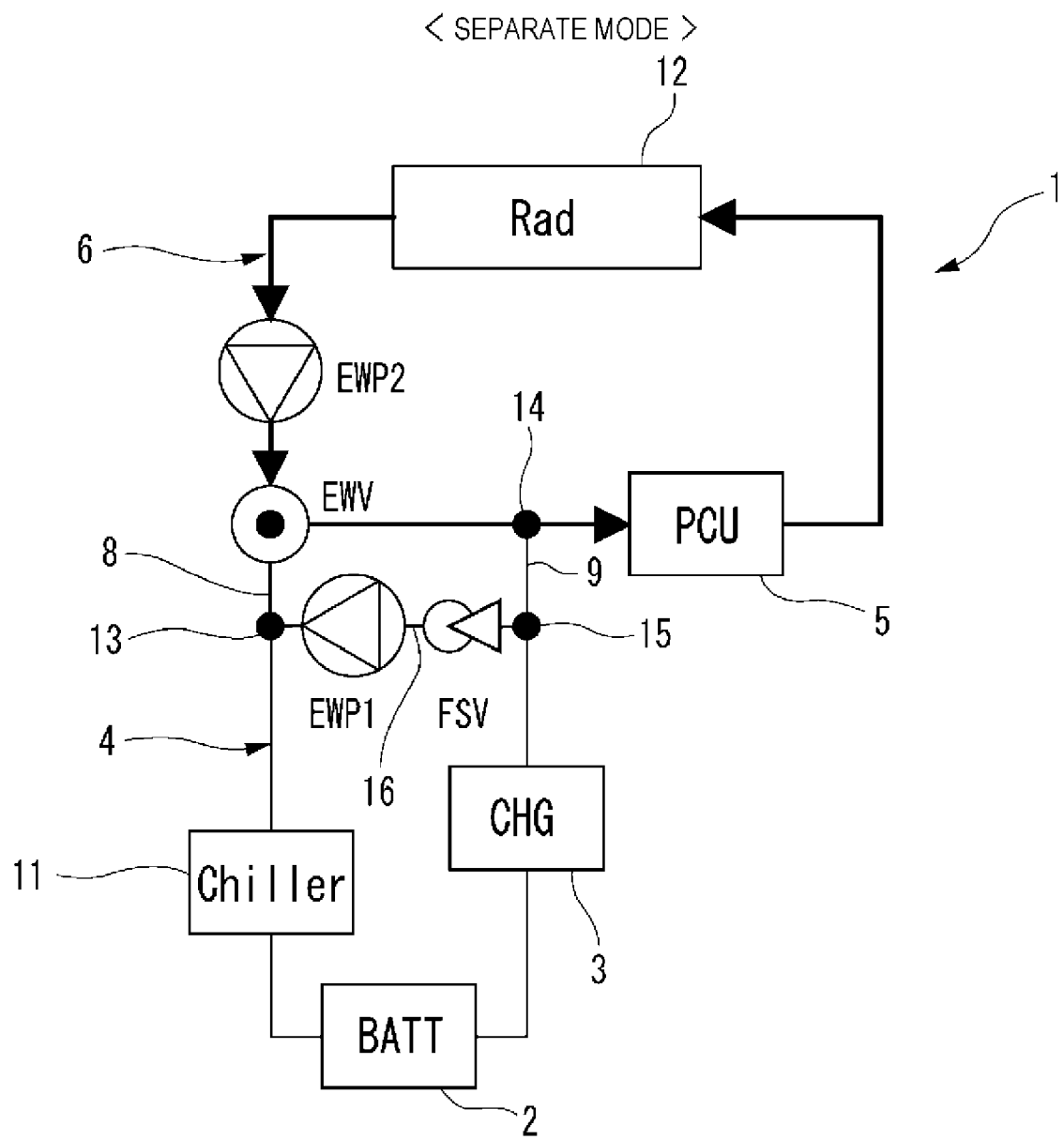
FIG. 2 is an explanatory diagram illustrating a flow of a heat medium in a separate mode in the temperature adjustment circuit of FIG. 1.

The electromagnetic switching valve EWV of the present embodiment is an electromagnetic three-way valve, and in the separate mode and the parallel cooling mode, connection between a downstream side flow path of the second pump EWP2 and an upstream side flow path of the power conversion device 5 is allowed, and connection between the downstream side flow path of the second pump EWP2 and the first coupling passage 8 to be described later is cut off. In the separate mode and the parallel cooling mode, as illustrated in FIGS. 2 and 3, by driving the second pump EWP2, the heat medium discharged by the second pump EWP2 can be circulated in an order of the power conversion device 5 and the radiator 12. As a result, the heat medium cooled by the radiator 12 exchanges heat with the power conversion device 5, and the power conversion device 5 is cooled.

Figure 4:
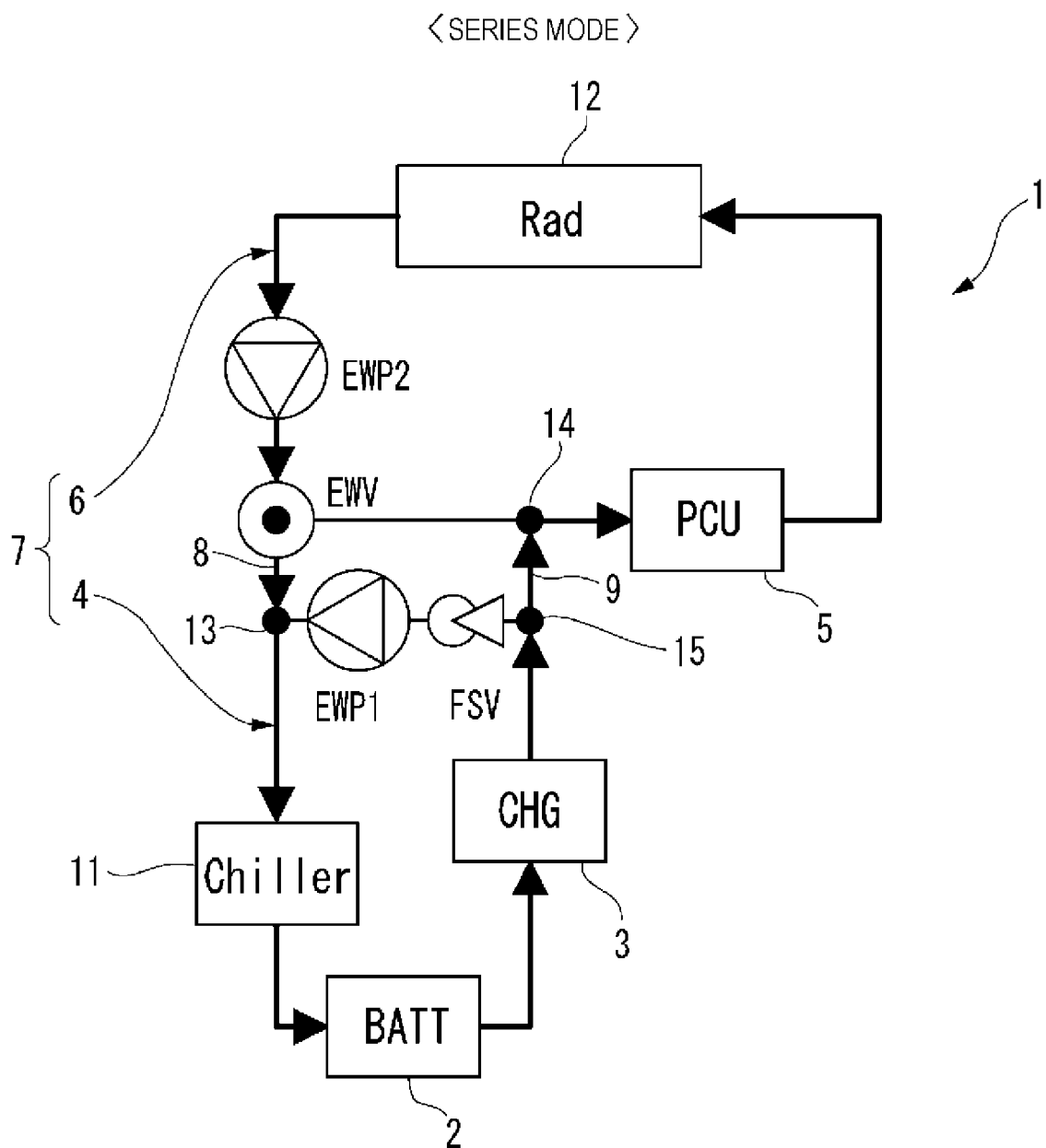
FIG. 4 is an explanatory diagram illustrating a flow of the heat medium in a series mode in the temperature adjustment circuit of FIG. 1.

In the series mode, as illustrated in FIG. 4, the electromagnetic switching valve EWV cuts off the connection between the downstream side flow path of the second pump EWP2 and the upstream side flow path of the power conversion device 5, and allows the connection between the downstream side flow path of the second pump EWP2 and the first coupling passage 8 to be described later. A flow of a heat refrigerant in the series mode will be described later.

[Coupling Circuit]

The coupling passages 8, 9 include the first coupling passage 8 and the second coupling passage 9. The first coupling passage 8 connects a first connection portion (electromagnetic switching valve EWV) of the second temperature adjustment circuit 6 and a first connection portion 13 of the first temperature adjustment circuit 4, and the second coupling passage 9 connects a second connection portion 14 of the second temperature adjustment circuit 6 and a second connection portion 15 of the first temperature adjustment circuit 4. The second connection portion 14 of the second temperature adjustment circuit 6 is positioned downstream of the electromagnetic switching valve EWV in the second temperature adjustment circuit 6 and upstream of the power conversion device 5, the first connection portion 13 of the first temperature adjustment circuit 4 is positioned downstream of the first pump EWP1 in the first temperature adjustment circuit 4 and upstream of the chiller 11, and the second connection portion 15 of the first temperature adjustment circuit 4 is positioned downstream of the charger 3 in the first temperature adjustment circuit 4 and upstream of the electromagnetic on-off valve FSV.

A passage between the first connection portion 13 and the second connection portion 15 in the first temperature adjustment circuit 4, that is, a passage in which the first pump EWP1 and the electromagnetic on-off valve FSV are disposed in the first temperature adjustment circuit 4 functions as a branch passage 16 which bypasses a part thereof in the coupling circuit 7.

As illustrated in FIG. 4, in the series mode in which the heat medium circulates through the coupling circuit 7, operations of the first pump EWP1 and the chiller 11 are stopped, and the heat medium is circulated by driving the second pump EWP2. As a result, the heat medium discharged from the second pump EWP2 is circulated in an order of the battery 2, the charger 3, the power conversion device 5, and the radiator 12, and the battery 2, the charger 3, and the power conversion device 5 are cooled. In addition, in the series mode, the electromagnetic on-off valve FSV is closed to stop the circulation of the heat medium via the branch passage 16.

[Control Device]

The control device 10 receives temperature information from a first temperature sensor S1 which acquires a first temperature Tbat, which is the temperature of the battery 2, a second temperature sensor S2 which acquires a second temperature Tw2, which is a temperature of the heat medium at an inlet of the battery 2, a third temperature sensor S3 which acquires a third temperature Tw3, which is a temperature of the heat medium at an outlet of the radiator 12 or a temperature of the heat medium at an inlet of the electromagnetic switching valve EWV, and a fourth temperature sensor S4 which acquires a fourth temperature Tw4, which is a temperature of the heat medium at an inlet of the power conversion device 5, and selects any one mode of the modes in accordance with the first temperature Tbat, the second temperature Tw2, the third temperature Tw3, and the fourth temperature Tw4. Hereinafter, a mode selection process of the control device 10 during traveling will be described with reference to FIGS. 5 to 7, and a mode selection process of the control device 10 during charging will be described with reference to FIGS. 8 and 9.

[Mode Selection Process During Traveling]

Figure 5:
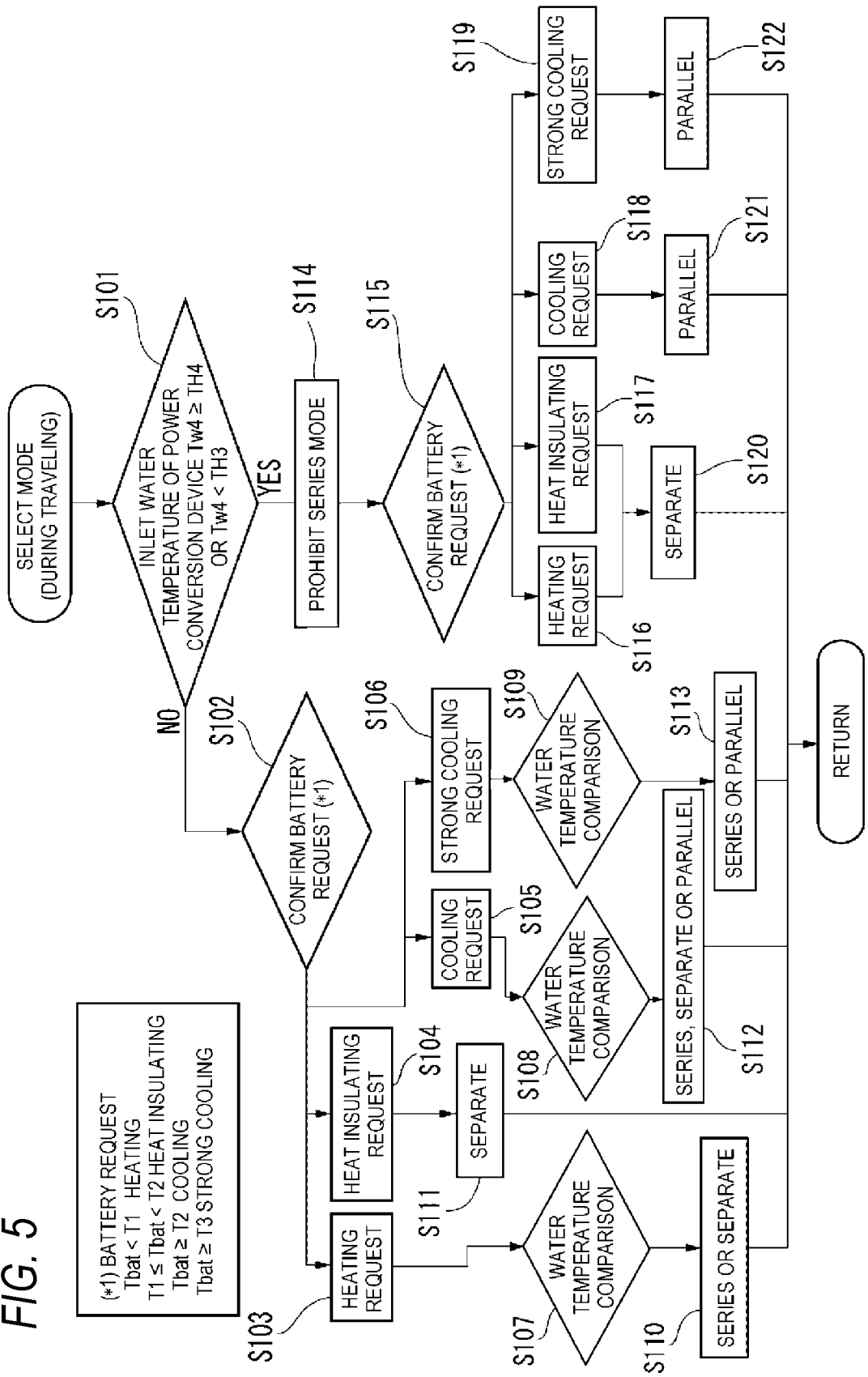
FIG. 5 is a flowchart illustrating a mode selection process (during traveling) of the temperature adjustment circuit of FIG. 1.

As illustrated in FIG. 5, the control device 10 first determines whether the fourth temperature Tw4 is out of a predetermined temperature range (TH3≤Tw4<TH4) during traveling (S101). In a case where a determination result is NO, the control device 10 selects a mode in accordance with a battery request (S102 to S106) and water temperature comparison between the second temperature Tw2 and the third temperature Tw3 (S107 to S109) (S110 to S113), and in a case where the determination result is YES, the control device 10 prohibits the series mode (S114), and then selects the mode in accordance with the battery request (S115 to S119) (S120 to S122).

Specifically, in the case where the determination result of step S101 is NO, the control device 10 confirms whether the battery request is a heating request, a heat insulating request, a cooling request, or a strong cooling request (S102 to S106). The battery request is the heating request when the first temperature Tbat is lower than a first threshold value T1, is the heat insulating request when the first temperature Tbat is equal to or higher than the first threshold value T1 and lower than a second threshold value T2, is the cooling request when the first temperature Tbat is equal to or higher than the second threshold value T2 and lower than a third threshold value T3, and is the strong cooling request when the first temperature Tbat is equal to or higher than the third threshold value T3. Here, the first threshold value T1 is a threshold value on a low temperature side at which the battery 2 cannot satisfy an output request from the vehicle. The second threshold value T2 is a threshold value for starting the cooling of the battery 2 in order to suppress deterioration of cells of the battery 2. The third threshold value T3 is a threshold value which requires strong cooling below the outside air temperature in order to suppress the deterioration of the cells of the battery 2.

In step S102, in a case where the control device 10 determines that the battery request is the heating request (S103), the control device 10 selects the separate mode or the series mode in accordance with the water temperature comparison between the second temperature Tw2 and the third temperature Tw3 (S107) (S110).

Figure 6:
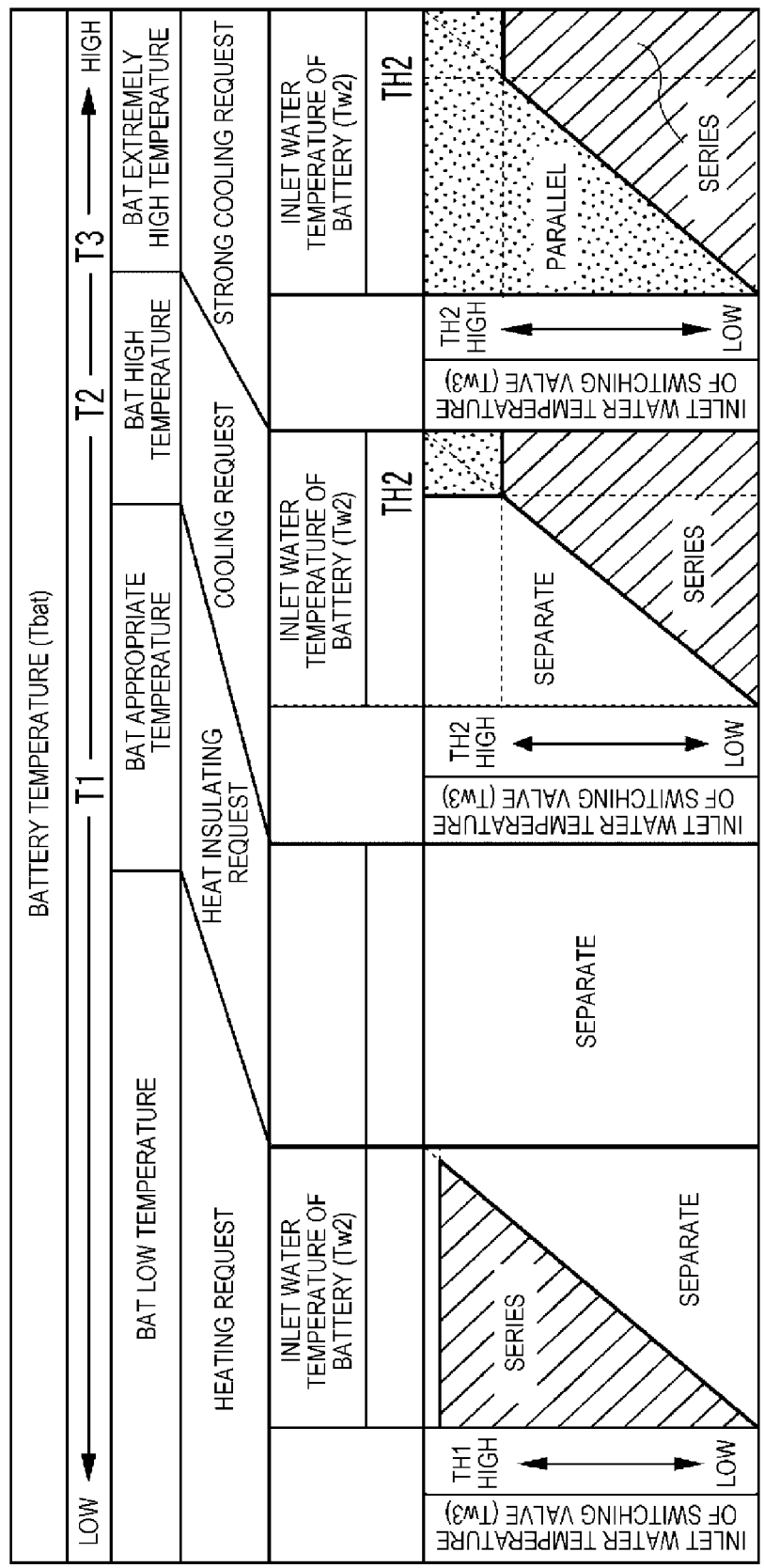
FIG. 6 is an explanatory diagram illustrating a mode selected by the mode selection process of FIG. 5 (in a case where an inlet temperature of a power conversion device is within a predetermined temperature range).

A specific description will be given with reference to FIG. 6 as well. In step S107, in a case where the control device 10 determines that the third temperature Tw3 is equal to or higher than a first predetermined value TH1, the control device 10 selects the separate mode. That is, when the first temperature Tbat is low and the third temperature Tw3 is equal to or higher than the first predetermined value TH1, the separate mode is set, so that not only a flow rate of the heat medium flowing through the power conversion device 5 can be ensured and the power conversion device 5 can be cooled at an early stage, but also the high-temperature heat medium can be prevented from flowing to the battery 2, and the deterioration of the battery 2 can be suppressed.

In step S107, in a case where the control device 10 determines that the third temperature Tw3 is lower than the first predetermined value TH1 and lower than the second temperature Tw2, the control device 10 selects the separate mode. That is, when the first temperature Tbat is low and the third temperature Tw3 is lower than the second temperature Tw2, the separate mode is set, so that the battery 2 can be prevented from being further cooled. In addition, in the case where the first temperature adjustment circuit 4 includes the heating unit, the battery 2 can be efficiently heated in a state of being separated from the second temperature adjustment circuit 6.

In step S107, in a case where the control device 10 determines that the third temperature Tw3 is lower than the first predetermined value TH1 and is equal to or higher than the second temperature Tw2, the control device 10 selects the series mode. That is, in the case where the first temperature Tbat is low, when the third temperature Tw3 is equal to or higher than the second temperature Tw2, the heat medium is circulated in the coupling circuit 7 in the series mode, so that the battery 2 can be heated by using the outside air and the cooling heat of the power conversion device 5.

In step S102, in a case where the control device 10 determines that the battery request is the heat insulating request (S104), the control device 10 selects the separate mode (S111). That is, in a case where the first temperature Tbat is appropriate, the heat medium is circulated in the second temperature adjustment circuit 6 in the separate mode, so that the power conversion device 5 can be efficiently cooled. In this state, the deviation of the temperature of the heat medium may be eliminated by circulating the heat medium through the first temperature adjustment circuit 4 without operating the chiller 11.

In step S102, in a case where the control device 10 determines that the battery request is the cooling request (S105), the control device 10 selects any one of the parallel cooling mode, the separate mode, and the series mode in accordance with the water temperature comparison between the second temperature Tw2 and the third temperature Tw3 (S108) (S112).

A specific description will be given with reference to FIG. 6 as well. In step S108, in a case where the control device 10 determines that the second temperature Tw2 and the third temperature Tw3 are equal to or higher than a second predetermined value TH2, the control device 10 selects the parallel cooling mode. That is, in a case where the first temperature Tbat is high, when the second temperature Tw2 and the third temperature Tw3 are equal to or higher than the second predetermined value TH2, since the battery 2 cannot be sufficiently cooled by heat exchange in the radiator 12, the battery 2 can be appropriately cooled by cooling the battery 2 by the chiller 11. In addition, since the radiator 12 can be devoted to the cooling of the power conversion device 5, the power conversion device 5 can be efficiently cooled.

In step S108, in a case where the control device 10 determines that the second temperature Tw2 is lower than the second predetermined value TH2 and the third temperature Tw3 is equal to or higher than the second temperature Tw2, the control device 10 selects the separate mode. That is, in a case where the first temperature Tbat is high, when the second temperature Tw2 is lower than the second predetermined value TH2 and the third temperature Tw3 is equal to or higher than the second temperature Tw2, the separate mode is selected, so that a required flow rate required for cooling the power conversion device 5 can be ensured. In addition, the separate mode is set, so that the high-temperature heat medium can be prevented from flowing to the battery 2, and the deterioration of the battery 2 can be suppressed.

In step S108, in a case where the control device 10 determines that the third temperature Tw3 is lower than the second predetermined value TH2 and the third temperature Tw3 is lower than the second temperature Tw2, the control device 10 selects the series mode. That is, in the case where the first temperature Tbat is high, when the third temperature Tw3 is lower than the second predetermined value TH2 and the third temperature Tw3 is lower than the second temperature Tw2, the series mode is selected, so that the battery 2 in a high temperature state can be efficiently cooled by the heat exchange of the radiator 12.

In step S102, in a case where the control device 10 determines that the battery request is the strong cooling request (S106), the control device 10 selects the parallel cooling mode or the series mode in accordance with the water temperature comparison between the second temperature Tw2 and the third temperature Tw3 (S109) (S113).

Specifically, in step S109, in the case where the control device 10 determines that the third temperature Tw3 is equal to or higher than the second predetermined value TH2, the control device 10 selects the parallel cooling mode. That is, in a case where the first temperature Tbat is extremely high, when the third temperature Tw3 is equal to or higher than the second predetermined value TH2, since the battery 2 cannot be sufficiently cooled by the heat exchange in the radiator 12, the battery 2 can be appropriately cooled by cooling the battery 2 by the chiller 11. In addition, since the radiator 12 can be devoted to the cooling of the power conversion device 5, the power conversion device 5 can be efficiently cooled.

In step S109, in a case where the control device 10 determines that the third temperature Tw3 is lower than the second predetermined value TH2 and is equal to or higher than the second temperature Tw2, the control device 10 selects the parallel cooling mode. That is, in the case where the first temperature Tbat is extremely high, when the third temperature Tw3 is lower than the second predetermined value TH2 and is equal to or higher than the second temperature Tw2, since the battery 2 cannot be sufficiently cooled by the heat exchange in the radiator 12, the battery 2 can be appropriately cooled by cooling the battery 2 by the chiller 11. In addition, since the radiator 12 can be devoted to the cooling of the power conversion device 5, the power conversion device 5 can be efficiently cooled.

In step S109, in a case where the control device 10 determines that the third temperature Tw3 is lower than the second predetermined value TH2 and lower than the second temperature Tw2, the control device 10 selects the series mode. That is, in the case where the first temperature Tbat is extremely high, when the third temperature Tw3 is lower than the second predetermined value TH2 and lower than the second temperature Tw2, the series mode is selected, so that the battery 2 in an extremely high temperature state can be efficiently cooled by the heat exchange of the radiator 12. In addition, power consumption of the chiller 11 can be suppressed.

On the other hand, in the case where the determination result of step S101 is YES, the control device 10 prohibits the series mode (S114), and then selects the mode in accordance with the battery request (S115 to S119) (S120 to S122). A specific description will be given with reference to FIG. 7 as well. In step S115, the control device 10 selects the separate mode (S120) in a case where it is determined that the battery request is the heating request or the heat insulating request (S116, S117), and selects the parallel cooling mode (S121, S122) in a case where it is determined that the battery request is the cooling request or the strong cooling request (S118, S119). That is, when the fourth temperature Tw4 is higher than the predetermined temperature range, the series mode is prohibited, and the separate mode or the parallel cooling mode is selected, so that the battery 2 can be appropriately cooled while ensuring the required flow rate required for cooling the power conversion device 5. In addition, when the fourth temperature Tw4 is a temperature lower than the predetermined temperature range, the series mode is prohibited, and the separate mode or the parallel cooling mode is selected, so that a heat medium having a high viscosity can be prevented from circulating in the coupling circuit 7, and accordingly a pressure loss can be reduced.

[Mode Selection Process During Charging]

Figure 8:
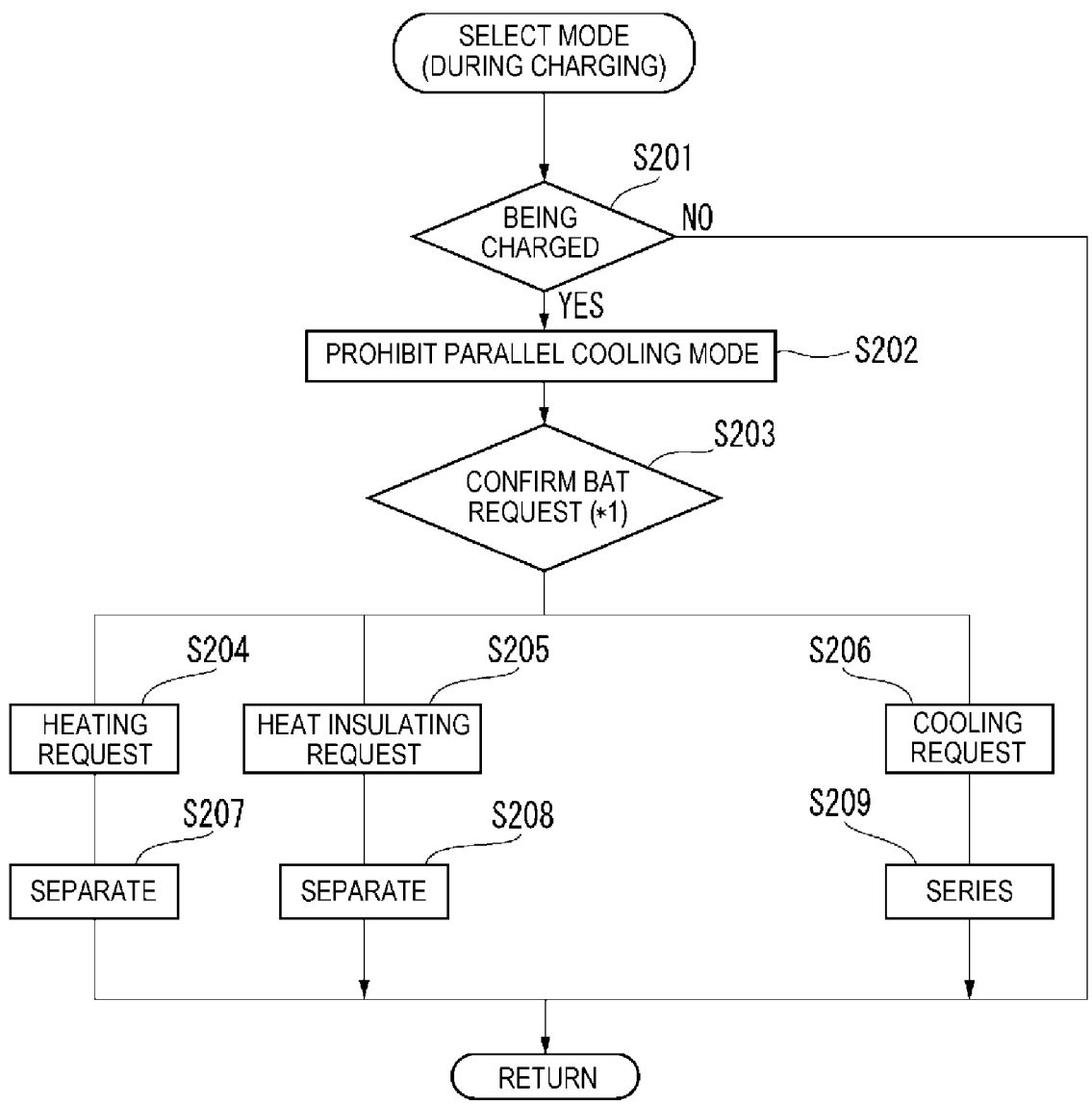
FIG. 8 is a flowchart illustrating a mode selection process (during charging) of the temperature adjustment circuit of FIG. 1.
Figure 9:
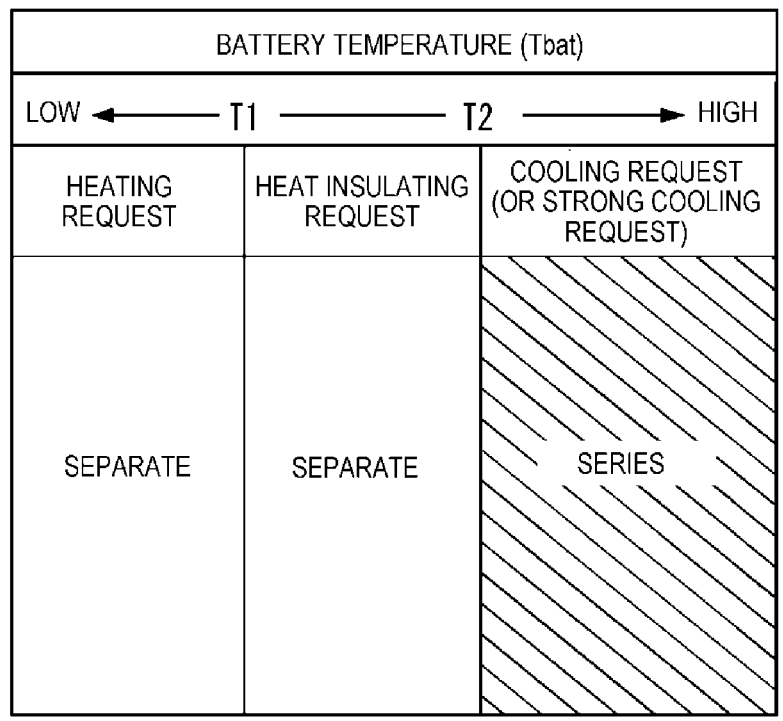
FIG. 9 is an explanatory diagram illustrating a mode selected by the mode selection process of FIG. 8.

As illustrated in FIG. 8, the control device 10 determines whether the battery 2 is being charged by the charger 3 (S201), and in a case where a determination result is YES, the control device 10 prohibits the parallel cooling mode (S202), and then selects the mode in accordance with the battery request (S203 to S206) (S207 to S209). A specific description will be given with reference to FIG. 9 as well. In step S203, the control device 10 selects the separate mode (S207, S208) in a case where it is determined that the battery request is the heating request or the heat insulating request (S204, S205), and selects the series mode (S209) in a case where it is determined that the battery request is the cooling request or the strong cooling request (S206). That is, during the charging of the battery 2, by prohibiting the parallel cooling mode, the battery 2, the charger 3, and the power conversion device 5 can be appropriately cooled in the separate mode or the series mode while suppressing the power consumption associated with an operation of the chiller 11 and suppressing prolongation of charging time.

In the mode selection process illustrated in FIG. 8, while the selection of the parallel cooling mode is prohibited during the charging of the battery 2, the parallel cooling mode may be selected in a case where the heat generation of the battery 2 is increased during the selection of the series mode of S209 and the first temperature Tbat becomes equal to or higher than the predetermined temperature or in a case where it is predicted that the first temperature Tbat becomes higher than the predetermined temperature without prohibiting the selection of the parallel cooling mode. For example, in a case where the first temperature Tbat becomes equal to or higher than the predetermined temperature or it is predicted that the first temperature Tbat becomes higher than the predetermined temperature during rapid charging of the battery 2, the battery 2 can be appropriately cooled by the chiller 11 by selecting the parallel cooling mode.

In the above embodiment, the first threshold value T1<the second threshold value T2<the third threshold value T3. In addition, it is preferable that the third predetermined value TH3<the first threshold value T1, the second threshold value T2<the second predetermined value TH2, and it is preferable that the second predetermined value TH2<the third threshold value T3.

Figure 10:
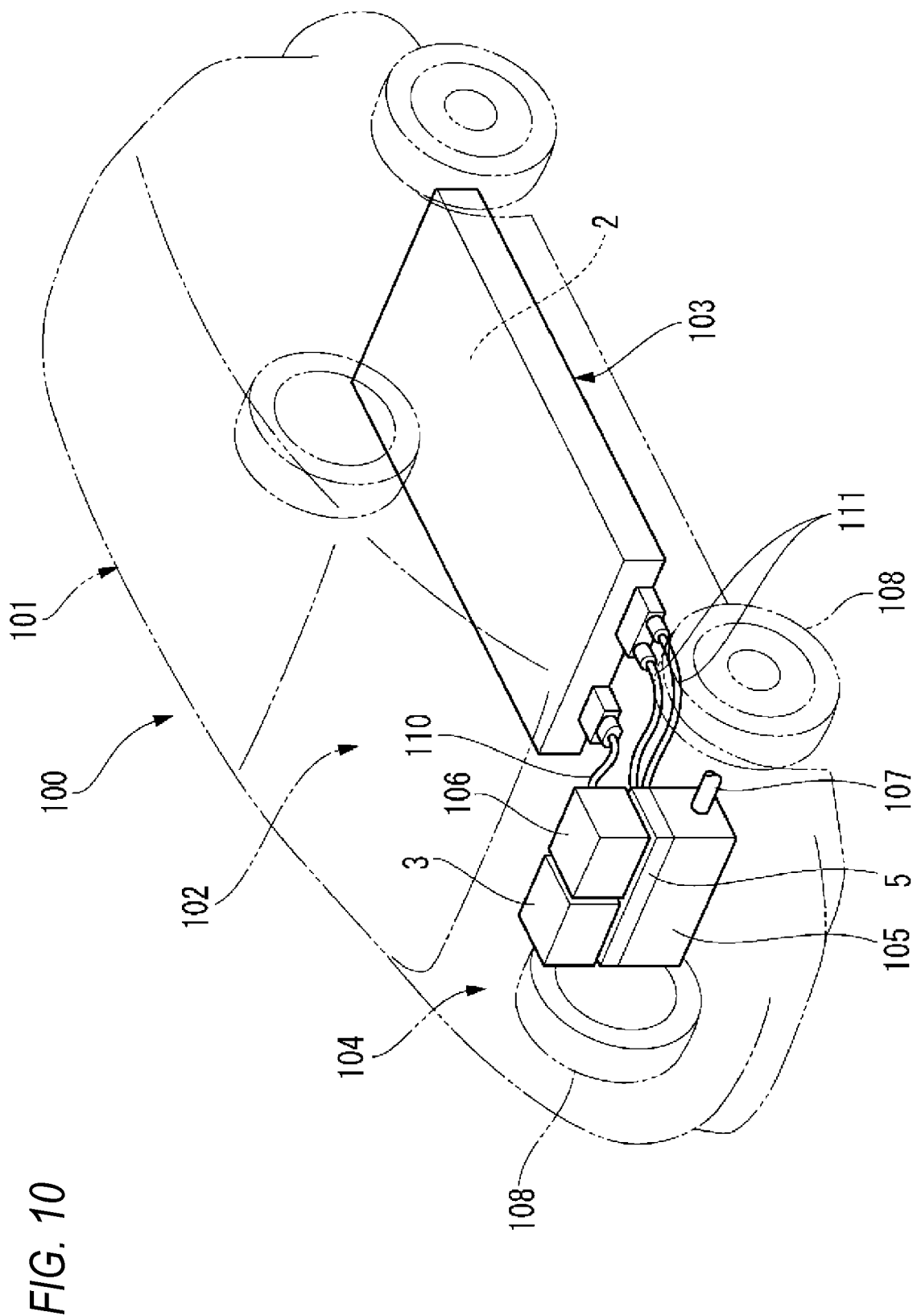
FIG. 10 is a perspective view illustrating a schematic configuration of the vehicle according to the embodiment of the present invention.

FIG. 10 is a perspective view illustrating a schematic configuration of a vehicle 100 which is a vehicle according to the embodiment of the present invention. The vehicle 100 may be an electric vehicle having only an electric motor as a drive source, a fuel cell vehicle, or a hybrid automobile having an electric motor and an internal combustion engine. In the following description, an electric vehicle will be described as an example. In FIG. 10, the temperature adjustment circuit 1 and the air conditioner AC are omitted.

A vehicle body 101 of the vehicle 100 is provided with a battery case 103 which accommodates the battery 2 at an underfloor portion of a vehicle interior 102. A motor room 104 is provided in a front portion of the vehicle 100. A motor 105, the power conversion device 5, a branch unit 106, the charger 3, and the like are provided in the motor room 104.

A rotational driving force of the motor 105 is transmitted to a shaft 107. Front wheels 108 of the vehicle 100 are connected to both end portions of the shaft 107. The power conversion device 5 is disposed above the motor 105 and is fastened and fixed directly to a case of the motor 105. The power conversion device 5 is electrically connected to a connector of the battery case 103 via power source cables 111. In addition, the power conversion device 5 is electrically connected to the motor 105 by, for example, a three-phase bus bar. The power conversion device 5 controls driving of the motor 105 by electric power supplied from the battery 2.

The branch unit 106 and the charger 3 are disposed side by side in parallel in left and right sides. The branch unit 106 and the charger 3 are disposed above the power conversion device 5. The branch unit 106 and the charger 3 are disposed in a state of being separated from the power conversion device 5. The branch unit 106 and the battery case 103 are electrically connected to each other by a cable 110 having connectors at both ends.

The branch unit 106 is electrically connected to the charger 3. The charger 3 is connected to a general external power source such as a household power source to charge the battery 2. The charger 3 and the branch unit 106 are electrically connected to each other by a cable (not illustrated) having connectors at both ends.

Although the embodiment of the present invention has been described above, the present invention is not limited to the above embodiment, and can be appropriately modified, improved, or the like. For example, the control device 10 of the above embodiment selects the parallel cooling mode in accordance with the first temperature Tbat, which is the current temperature of the battery 2, but the parallel cooling mode may be selected in advance in a case where the air conditioner AC has a sufficient cooling capacity to cool the vehicle interior and a possibility, which the parallel cooling mode is selected, is predicted (for example, when a temperature outside the vehicle is on the rise). According to the mode selection process, the temperatures of the heat medium and the battery 2 can be lowered in advance.

In a case where the first temperature Tbat decreases and the parallel cooling mode is released, the control device 10 may prohibit transition to the series mode for a predetermined period of time. According to such a mode selection process, it is possible to avoid a rapid increase in the temperature due to the transition to the series mode.

In the present specification, at least the following matters are described. Although corresponding constituent elements or the like in the above embodiment are illustrated in parentheses, the present invention is not limited thereto.

(1) A vehicle (vehicle V) including:

a battery (battery 2);

an air conditioner (air conditioner AC);

a first temperature adjustment circuit (first temperature adjustment circuit 4) including a first pump (first pump EWP1) configured to supply a heat medium to the battery, and a first heat exchange unit (chiller 11) configured to exchange heat between the heat medium and a heat medium for air conditioning;

a second temperature adjustment circuit (second temperature adjustment circuit 6) including a second pump (second pump EWP2) configured to supply the heat medium to a power conversion device (power conversion device 5), and a second heat exchange unit (radiator 12) configured to exchange heat between the heat medium and an outside air;

a coupling passage (first coupling passage 8, second coupling passage 9) configured to connect the first temperature adjustment circuit and the second temperature adjustment circuit to form a coupling circuit (coupling circuit 7);

a switching unit (electromagnetic switching valve EWV) configured to switch between a circulation state, in which the heat medium is capable of circulating through the coupling circuit, and a non-circulation state, in which the heat medium is not capable of circulating through the coupling circuit;

a first temperature acquisition unit (first temperature sensor S1) configured to acquire a first temperature (first temperature Tbat) which is a temperature of the battery; and a control device (control device 10) configured to select any one mode of a plurality of modes, in which the plurality of modes include:
  a series mode in which, in the circulation state, the heat medium is circulated in the coupling circuit in a state in which the first heat exchange unit is not capable of exchanging heat between the heat medium and the heat medium for air conditioning;
  a separate mode in which the heat medium is circulated in the second temperature adjustment circuit in the non-circulation state; and
  a parallel cooling mode in which, in the non-circulation state, the heat medium is circulated in the second temperature adjustment circuit, and the heat medium is circulated in the first temperature adjustment circuit in a state in which the first heat exchange unit is capable of exchanging heat between the heat medium and the heat medium for air conditioning, and in which the control device selects the any one mode of the plurality of modes in accordance with the first temperature.

According to (1), the mode is selected in accordance with the first temperature which is the temperature of the battery, so that the battery can be appropriately cooled as compared with a case where the switching is controlled in accordance with an outside air temperature.

(2) The vehicle according to (1), further including:
  a second temperature acquisition unit (second temperature sensor S2) configured to acquire a second temperature (second temperature Tw2) which is a temperature of the heat medium at an inlet of the battery;
  a third temperature acquisition unit (third temperature sensor S3) configured to acquire a temperature of the heat medium at an outlet of the second heat exchange unit or a third temperature (third temperature Tw3) which is a temperature of the heat medium at an inlet of the switching unit; and
  a fourth temperature acquisition unit (fourth temperature sensor S4) configured to acquire a fourth temperature (fourth temperature Tw4) which is a temperature of the heat medium at an inlet of the power conversion device, in which the control device selects any one mode of the plurality of modes in accordance with the first temperature, the second temperature, the third temperature, and the fourth temperature.

According to (2), the mode is selected in accordance with the first temperature which is the temperature of the battery, the second temperature which is an inlet water temperature of the battery, the third temperature which is an outlet water temperature of the second heat exchange unit or an inlet water temperature of the switching unit, and the fourth temperature which is an inlet water temperature of the power conversion device, so that the battery and the power conversion device can be appropriately cooled.

(3) The vehicle according to (2),
in which the control device prohibits the series mode when the fourth temperature is out of a predetermined temperature range.

According to (3), when the fourth temperature is higher than the predetermined temperature range, the series mode is prohibited, so that a required flow rate required for cooling the power conversion device can be ensured. In addition, when the fourth temperature is a temperature lower than the predetermined temperature range, the series mode is prohibited, so that a heat medium having a high viscosity can be prevented from circulating in the coupling circuit, and accordingly a pressure loss can be reduced.

(4) The vehicle according to (2) or (3),
in which in a case where the first temperature is lower than a first threshold value (first threshold value T1), when the third temperature is equal to or higher than a first predetermined value (first predetermined value TH1), the control device selects the separate mode.

According to (4), in the case where the first temperature is lower than the first threshold value (for example, low temperature), when the third temperature is equal to or higher than the first predetermined value, the separate mode is set, so that not only a flow rate of the heat medium flowing in the power conversion device can be ensured and the power conversion device can be cooled at an early stage, but also the high-temperature heat medium can be prevented from flowing to the battery, and deterioration of the battery can be suppressed.

(5) The vehicle according to any one of (2) to (4),
in which in the case where the first temperature is lower than the first threshold value (first threshold value T1), when the third temperature is lower than the first predetermined value (first predetermined value TH1) and lower than the second temperature, the control device selects the separate mode.

According to (5), in the case where the first temperature is lower than the first threshold value (for example, low temperature), when the third temperature is lower than the second temperature, the separate mode is set, so that the battery can be prevented from being further cooled. In addition, in the case where the first temperature adjustment circuit includes a heating unit, the battery can be efficiently heated in a state of being separated from the second temperature adjustment circuit.

(6) The vehicle according to any one of (2) to (5),
in which in the case where the first temperature is lower than the first threshold value (first threshold value T1), when the third temperature is lower than the first predetermined value (first predetermined value TH1) and is equal to or higher than the second temperature, the control device selects the series mode.

According to (6), in the case where the first temperature is lower than the first threshold value (for example, low temperature), when the third temperature is equal to or higher than the second temperature, the heat medium is circulated in the coupling circuit in the series mode, so that the battery can be heated by using the outside air and cooling heat of the power conversion device.

(7) The vehicle according to any one of (2) to (6),
in which in a case where the first temperature is equal to or higher than the first threshold value (first threshold value T1) and lower than a second threshold value (second threshold value T2), the control device selects the separate mode.

According to (7), in the case where the first temperature is equal to or higher than the first threshold value and lower than the second threshold value (for example, appropriate temperature), the heat medium is circulated in the second temperature adjustment circuit in the separate mode, so that the power conversion device can be efficiently cooled.

(8) The vehicle according to any one of (2) to (7), in which in a case where the first temperature is equal to or higher than the second threshold value (second threshold value T2) and lower than a third threshold value (third threshold value T3), when the second temperature and the third temperature are equal to or higher than a second predetermined value (second predetermined value TH2), the control device selects the parallel cooling mode.

According to (8), in the case where the first temperature is equal to or higher than the second threshold value and lower than the third threshold value (for example, high temperature), when the second temperature and the third temperature are equal to or higher than the second predetermined value, since the battery cannot be sufficiently cooled by heat exchange in the second heat exchange unit, the battery can be appropriately cooled by cooling the battery by the first heat exchange unit. In addition, since the second heat exchange unit can be devoted to the cooling of the power conversion device, the power conversion device can be efficiently cooled.

(9) The vehicle according to any one of (2) to (8), in which in the case where the first temperature is equal to or higher than the second threshold value (second threshold value T2) and lower than the third threshold value (third threshold value T3), when the second temperature is lower than the second predetermined value (second predetermined value TH2), and the third temperature is equal to or higher than the second temperature, the control device selects the separate mode.

According to (9), in the case where the first temperature is equal to or higher than the second threshold value and lower than the third threshold value (for example, high temperature), when the second temperature is lower than the second predetermined value and the third temperature is equal to or higher than the second temperature, the separate mode is selected, so that the required flow rate required for cooling the power conversion device can be ensured. In addition, the separate mode is selected, so that the high-temperature heat medium can be prevented from flowing to the battery, and the deterioration of the battery can be suppressed.

(10) The vehicle according to any one of (2) to (9), in which in the case where the first temperature is equal to or higher than the second threshold value (second threshold value T2) and lower than the third threshold value (third threshold value T3), when the third temperature is lower than the second predetermined value (second predetermined value TH2), and the third temperature is lower than the second temperature, the control device selects the series mode.

According to (10), in the case where the first temperature is equal to or higher than the second threshold value and lower than the third threshold value (for example, high temperature), when the third temperature is lower than the second predetermined value and the third temperature is lower than the second temperature, the series mode is selected, so that the battery in a high temperature state can be efficiently cooled by the heat exchange of the second heat exchange unit.

(11) The vehicle according to any one of (2) to (10), in which in a case where the first temperature is equal to or higher than the third threshold value (third threshold value T3), when the third temperature is equal to or higher than the second predetermined value (second predetermined value TH2), the control device selects the parallel cooling mode.

According to (11), in the case where the first temperature is equal to or higher than the third threshold value (for example, extremely high temperature), when the third temperature is equal to or higher than the second predetermined value, since the battery cannot be sufficiently cooled by the heat exchange in the second heat exchange unit, the battery can be appropriately cooled by cooling the battery by the first heat exchange unit. In addition, since the second heat exchange unit can be devoted to the cooling of the power conversion device, the power conversion device can be efficiently cooled.

(12) The vehicle according to any one of (2) to (11), in which in the case where the first temperature is equal to or higher than the third threshold value (third threshold value T3), when the third temperature is lower than the second predetermined value (second predetermined value TH2) and is equal to or higher than the second temperature, the control device selects the parallel cooling mode.

According to (12), in the case where the first temperature is equal to or higher than the third threshold value (for example, extremely high temperature), when the third temperature is lower than the second predetermined value and is equal to or higher than the second temperature, since the battery cannot be sufficiently cooled by the heat exchange in the second heat exchange unit, the battery can be appropriately cooled by cooling the battery by the first heat exchange unit. In addition, since the second heat exchange unit can be devoted to the cooling of the power conversion device, the power conversion device can be efficiently cooled.

(13) The vehicle according to any one of (2) to (12), in which in the case where the first temperature is equal to or higher than the third threshold value (third threshold value T3), when the third temperature is lower than the second predetermined value (second predetermined value TH2) and lower than the second temperature, the control device selects the series mode.

According to (13), in the case where the first temperature is equal to or higher than the third threshold value (for example, extremely high temperature), when the third temperature is lower than the second predetermined value and lower than the second temperature, the series mode is selected, so that the battery in an extremely high temperature state can be efficiently cooled by the heat exchange of the second heat exchange unit. In addition, power consumption of the first heat exchange unit can be suppressed.

(14) The vehicle according to any one of (1) to (13), in which the control device selects the parallel cooling mode in a case where the air conditioner has a sufficient cooling capacity to cool a vehicle interior and a possibility, which the parallel cooling mode is selected, is predicted.

According to (14), in the case where the air conditioner has the sufficient cooling capacity to cool the vehicle interior and the possibility, which the parallel cooling mode is selected, is predicted, the temperatures of the heat medium and the battery can be lowered in advance by selecting the parallel cooling mode.

(15) The vehicle according to any one of (8), (11), (12), and (14), in which the control device prohibits transition to the series mode for a predetermined period of time in a case where the first temperature decreases and the parallel cooling mode is released.

According to (15), the control device prohibits the transition to the series mode for a predetermined period of time in the case where the first temperature decreases and the parallel cooling mode is released, so that it is possible to avoid a rapid increase in the temperature due to the transition to the series mode.

(16) The vehicle according to any one of (1) to (15), further including:
a charger (charger 3) configured to charge the battery,
in which the charger is disposed in the first temperature adjustment circuit, and
in which the control device prohibits selection of the parallel cooling mode, and selects the separate mode or the series mode during charging of the battery.

According to (16), the battery, the charger, and the power conversion device can be appropriately cooled in the separate mode or the series mode while suppressing power consumption associated with an operation of the first heat exchange unit during the charging of the battery and suppressing prolongation of charging time.

(17) The vehicle according to any one of (1) to (16), further including:
a charger (charger 3) configured to charge the battery,
in which the charger is disposed in the first temperature adjustment circuit, and
in which the control device selects the parallel cooling mode in a case where the first temperature becomes equal to or higher than the predetermined temperature or the first temperature is predicted to become higher than the predetermined temperature during the charging of the battery.

According to (17), even while the battery is being charged, the battery can be appropriately cooled by the first heat exchange unit.

REFERENCE SIGNS LIST 2 battery
3 charger
4 first temperature adjustment circuit
5 power conversion device
6 second temperature adjustment circuit
7 coupling circuit
8 first coupling passage
9 second coupling passage
10 control device
11 chiller (first heat exchange unit)
12 radiator (second heat exchange unit)
100 vehicle
EWV electromagnetic switching valve (switching unit)
EWP1 first pump
EWP2 second pump
S1 first temperature sensor (first temperature acquisition unit)
S2 second temperature sensor (second temperature acquisition unit)
S3 third temperature sensor (third temperature acquisition unit)
S4 fourth temperature sensor (fourth temperature acquisition unit)

The invention claimed is:
1. A vehicle comprising:
a battery;
an air conditioner;
a first temperature adjustment circuit including a first pump configured to supply a heat medium to the battery, and a first heat exchange unit configured to exchange heat between the heat medium and a heat medium for air conditioning;
a second temperature adjustment circuit including a second pump configured to supply the heat medium to a power conversion device, and a second heat exchange unit configured to exchange heat between the heat medium and an outside air;
a coupling passage configured to connect the first temperature adjustment circuit and the second temperature adjustment circuit to form a coupling circuit;
a switching unit configured to switch between a circulation state, in which the heat medium is capable of circulating through the coupling circuit, and a non-circulation state, in which the heat medium is not capable of circulating through the coupling circuit;
a first temperature acquisition unit configured to acquire a first temperature which is a temperature of the battery; and
a control device configured to select any one mode of a plurality of modes,
wherein the plurality of modes include:
a series mode in which, in the circulation state, the heat medium is circulated in the coupling circuit in a state in which the first heat exchange unit is not capable of exchanging heat between the heat medium and the heat medium for air conditioning;
a separate mode in which the heat medium is circulated in the second temperature adjustment circuit in the non-circulation state; and
a parallel cooling mode in which, in the non-circulation state, the heat medium is circulated in the second temperature adjustment circuit, and the heat medium is circulated in the first temperature adjustment circuit in a state in which the first heat exchange unit is capable of exchanging heat between the heat medium and the heat medium for air conditioning, and
wherein the control device selects the any one mode of the plurality of modes in accordance with the first temperature.

2. The vehicle according to claim 1, further comprising:
a second temperature acquisition unit configured to acquire a second temperature which is a temperature of the heat medium at an inlet of the battery;
a third temperature acquisition unit configured to acquire a temperature of the heat medium at an outlet of the second heat exchange unit or a third temperature which is a temperature of the heat medium at an inlet of the switching unit; and
a fourth temperature acquisition unit configured to acquire a fourth temperature which is a temperature of the heat medium at an inlet of the power conversion device,
wherein the control device selects any one mode of the plurality of modes in accordance with the first temperature, the second temperature, the third temperature, and the fourth temperature.

3. The vehicle according to claim 2,
wherein the control device prohibits the series mode when the fourth temperature is out of a predetermined temperature range.

4. The vehicle according to claim 2,
wherein in a case where the first temperature is lower than a first threshold value, when the third temperature is equal to or higher than a first predetermined value, the control device selects the separate mode.

5. The vehicle according to claim 2,
wherein in the case where the first temperature is lower than the first threshold value, when the third temperature is lower than the first predetermined value and lower than the second temperature, the control device selects the separate mode.

6. The vehicle according to claim 2,
wherein in the case where the first temperature is lower than the first threshold value, when the third temperature is lower than the first predetermined value and is equal to or higher than the second temperature, the control device selects the series mode.

7. The vehicle according to claim 2,
wherein in a case where the first temperature is equal to or higher than the first threshold value and lower than a second threshold value, the control device selects the separate mode.

8. The vehicle according to claim 2,
wherein in a case where the first temperature is equal to or higher than the second threshold value and lower than a third threshold value, when the second temperature and the third temperature are equal to or higher than a second predetermined value, the control device selects the parallel cooling mode.

9. The vehicle according to claim 2,
wherein in a case where the first temperature is equal to or higher than the second threshold value and lower than a third threshold value, when the second temperature is lower than the second predetermined value and the third temperature is equal to or higher than the second temperature, the control device selects the separate mode.

10. The vehicle according to claim 2,
wherein in a case where the first temperature is equal to or higher than the second threshold value and lower than a third threshold value, when the third temperature is lower than the second predetermined value and the third temperature is lower than the second temperature, the control device selects the series mode.

11. The vehicle according to claim 2,
wherein in a case where the first temperature is equal to or higher than the third threshold value, when the third temperature is equal to or higher than the second predetermined value, the control device selects the parallel cooling mode.

12. The vehicle according to claim 2,
wherein in the case where the first temperature is equal to or higher than the third threshold value, when the third temperature is lower than the second predetermined value and is equal to or higher than the second temperature, the control device selects the parallel cooling mode.

13. The vehicle according to claim 2,
wherein in the case where the first temperature is equal to or higher than the third threshold value, when the third temperature is lower than the second predetermined value and lower than the second temperature, the control device selects the series mode.

14. The vehicle according to claim 1,
wherein the control device selects the parallel cooling mode in a case where the air conditioner has a sufficient cooling capacity to cool a vehicle interior and a possibility, which the parallel cooling mode is selected, is predicted.

15. The vehicle according to claim 8,
wherein the control device prohibits transition to the series mode for a predetermined period of time in a case where the first temperature decreases and the parallel cooling mode is released.

16. The vehicle according to claim 1, further comprising:
a charger configured to charge the battery,
wherein the charger is disposed in the first temperature adjustment circuit, and
wherein the control device prohibits selection of the parallel cooling mode, and selects the separate mode or the series mode during charging of the battery.

17. The vehicle according to claim 1, further comprising:
a charger configured to charge the battery,
wherein the charger is disposed in the first temperature adjustment circuit, and
wherein the control device selects the parallel cooling mode in a case where the first temperature becomes equal to or higher than the predetermined temperature or the first temperature is predicted to become higher than the predetermined temperature during the charging of the battery.

* * * * *